United States Patent
Khlebnikov et al.

(10) Patent No.: US 10,079,634 B2
(45) Date of Patent: Sep. 18, 2018

(54) METHOD AND DEVICE FOR CROSS-POLARIZATION INTERFERENCE SUPPRESSION

(71) Applicant: HUAWEI TECHNOLOGIES CO., LTD., Shenzhen, Guangdong (CN)

(72) Inventors: Vasily Anatolevich Khlebnikov, Shenzhen (CN); Yanxing Zeng, Hangzhou (CN); Vladimir Iosifovich Ivanov, Moscow (RU); Jianqiang Shen, Hangzhou (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 15/217,391

(22) Filed: Jul. 22, 2016

(65) Prior Publication Data

US 2016/0329950 A1 Nov. 10, 2016

Related U.S. Application Data

(63) Continuation of application No. PCT/RU2014/000063, filed on Jan. 24, 2014.

(51) Int. Cl.
| | |
|---|---|
| *H04B 1/10* | (2006.01) |
| *G02B 6/00* | (2006.01) |
| *H04B 7/10* | (2017.01) |
| *H04B 7/06* | (2006.01) |
| *H04B 15/00* | (2006.01) |
| *H04B 7/08* | (2006.01) |

(52) U.S. Cl.
CPC ............... *H04B 7/10* (2013.01); *H04B 1/10* (2013.01); *H04B 7/063* (2013.01); *H04B 7/0854* (2013.01); *H04B 15/00* (2013.01)

(58) Field of Classification Search
CPC .... H04B 7/0615; H04B 7/063; H04B 7/0814; H04B 15/00; H04B 1/1081; H04B 1/7105
USPC ............................................. 375/349; 385/11
See application file for complete search history.

(56) References Cited

U.S. PATENT DOCUMENTS 6,208,295 B1 * 3/2001 Dogan ...................... G01S 3/74
                                                        342/361
7,855,082 B1 * 12/2010 Langkilde .............. G01N 21/65
                                                        436/164

(Continued)

OTHER PUBLICATIONS

International Search Report, dated Jul. 10, 2014, in corresponding International Application No. PCT/RU2014/000063 (3 pp.).
International Search Report, dated Oct. 7, 2014, in corresponding International Application No. PCT/RU2014/000063 (3 pp.) [previously submitted with the IDS filed Jul. 22, 2016].

(Continued)

*Primary Examiner* — Sam K Ahn
*Assistant Examiner* — Sarah Hassan
(74) *Attorney, Agent, or Firm* — Staas & Halsey LLP

(57) ABSTRACT

A method (1100) for cross-polarization interference power suppression in dual-polarization radio communication systems includes: filtering (1101) a vertical polarization component ($x_V(n)$) and a horizontal polarization component ($x_H(n)$) of a received dual-polarization channel signal by a 2×2 channel weights matrix (507, 508); and determining (1102) the 2×2 channel weights matrix (507, 508) based on a minimum variance distortionless response criterion.

9 Claims, 11 Drawing Sheets

(56) References Cited

U.S. PATENT DOCUMENTS

| | | | |
|---|---|---|---|
| 7,865,231 B2* | 1/2011 | Tearney | A61B 1/00165 600/407 |
| 8,020,075 B2* | 9/2011 | Kotecha | H04L 1/0029 370/332 |
| 8,036,282 B2* | 10/2011 | Mielezarek | H03M 13/47 370/334 |
| 2002/0004575 A1* | 1/2002 | Cozewith | C08F 210/06 526/348 |
| 2003/0130430 A1* | 7/2003 | Cozewith | C08F 210/06 525/240 |
| 2004/0137582 A1* | 7/2004 | Dordick | C08B 37/0021 435/101 |
| 2005/0030372 A1* | 2/2005 | Jung | A61B 5/0059 348/77 |
| 2005/0286665 A1* | 12/2005 | Resheff | H04B 7/10 375/350 |
| 2006/0235020 A1* | 10/2006 | Kim | C07D 487/04 514/243 |
| 2008/0027051 A1* | 1/2008 | Malmstrom | C07D 413/04 514/233.8 |

OTHER PUBLICATIONS

X. Guo et al., "Teaching Notes of MVDR in Digital Signal Processing (DSP)", IEEE International Conference on Teaching, Assessment, and Learning for Engineering (TALE) 2012, Session H3A, Aug. 20-23, 2012, Hong Kong, p. 5-8, 4 pages.

B. Widrow et al., "Adaptive Signal Processing", 1993, 11 pages, http://www.google.com/url?sa=t&rct=j&q=&esrc=s&source=web&cd=3&ved=0ahUKEwjFZ_6V2LXSAhVQ4WMKHaVrCh4QFggpMAI&url=http%3A&2F%2Fwww-isl.stanford.edu%2F~widrow%2Fpapers%2Fc1993adaptivesignal.pdf&usg=AFQjCNHOI5iFLjAjyqyZ_vZbA1sFN8M5sg.

R. Cusani et al., "A Simple Polarization-Recovery Algorithm for Dual-Polarized Cellular Mobile-Radio Systems in Time-Variant Faded Environments", IEEE Transactions on Vehicular Technology, vol. 49, No. 1, Jan. 2000, p. 220-228, 9 pages.

A. Dinc and Y. Bar-Ness, "Bootstrap; A Fast Blind Adaptive Signal Separator", IEEE, 1992, p. 325-328, 4 pages.

S. Haykin, "Communication Systems", $4^{th}$ Ed., 2001, New York, NY, 838 pages.

* cited by examiner

METHOD AND DEVICE FOR CROSS-POLARIZATION INTERFERENCE SUPPRESSION

CROSS-REFERENCE TO RELATED APPLICATIONS

This application is a continuation of International Application No. PCT/RU2014/000063, filed on Jan. 24, 2014, which is hereby incorporated by reference in its entirety.

TECHNICAL FIELD

The present disclosure relates to a method and a device for cross-polarization interference (XPI) suppression. The disclosure further relates to the field of cross-polarization interference cancellation (XPIC) in dual-polarization microwave (MW) radio multicarrier (MC) communication systems, in particular under conditions of uncertainty about parameters of cross-polarization interference and signal propagation channel.

BACKGROUND

In high-speed dual-polarization MW-MC radio communication links adaptive XPIC algorithms are utilized to compensate cross-polarization interference between a vertical-polarized component and a horizontal-polarized component of a dual-polarized received radio signal.

In the general case of signal propagation in a dual-polarization MW-MC terrestrial radio communication link an elementary two-input-two-output (2×2) subband XPI canceller may be used. An n-th input sample of such canceller may be represented as a 2-vector containing both the vertical (V) and horizontal (H) polarization complex component:

$$x(n) = Hs(n) + n(n) = \begin{bmatrix} x_V(n) \\ x_H(n) \end{bmatrix} = \begin{bmatrix} h_{11} & h_{12} \\ h_{21} & h_{22} \end{bmatrix} \begin{bmatrix} s_V(n) \\ s_H(n) \end{bmatrix} + \begin{bmatrix} n_V(n) \\ n_H(n) \end{bmatrix}, \quad (1)$$

$$n = 1, 2, \ldots$$

where $s_V(n)$ and $s_H(n)$ is the V- and H-polarization channel signal, correspondingly, $n_V(n)$ and $n_H(n)$ denote respectively the V- and H-polarization samples of stationary additive white Gaussian noise (AWGN), and H is the 2×2 channel matrix whose entries are unknown a priori. A channel model 100 according to equation (1) is depicted in FIG. 1.

The structure of the generalized 2×2 linear XPI canceller 200 is presented in FIG. 2 that depicts a nonsingular frequency-domain linear filter targeted to perform full separation of the V- and H-polarization channel signals over the corresponding frequency subband. A first subblock 201 processes the V-polarization channels and a second subblock 202 processes the H-polarization channels.

The canceller 200 is described by the following equation $$y(n) = W^H x(n) = \begin{bmatrix} y_V(n) \\ y_H(n) \end{bmatrix} = \begin{bmatrix} w_{11}^* & w_{21}^* \\ w_{12}^* & w_{22}^* \end{bmatrix} \begin{bmatrix} x_V(n) \\ x_H(n) \end{bmatrix}, \quad n = 1, 2, \ldots \quad (2)$$

where $x(n)$ and $y(n)$ is the input and output signal vector sequence, correspondingly, $W=[w_V \; w_H]$, and $(\;)^H$ denotes Hermitian conjugation.

Under conditions of uncertainty about parameters of the two symbol streams, $\{s_V(n)\}$ and $\{s_H(n)\}$, channel polarization matrix H entries, and variations of AWGN in equation (1), the problem of XPI cancellation can be solved by optimization of weight matrix W with respect to a suitable criterion. The methods developed basing on the adaptive approach applied to disclose the uncertainties can be roughly classified under the blind adaptive and adaptive trained categories. Because the blind adaptive algorithms require enormous volumes of input samples to converge they are considered to be not eligible for application in high-speed MW radio links.

For the adaptive trained XPIC problem, the weight matrix W can be found as a solution to the system of the minimum mean square error (MMSE) criteria:

$$\begin{cases} \min_{w_V} E\{\|\varepsilon_V(n)\|^2\} = \min_{w_V} E\{\|s_V(n) - w_V^H x(n)\|^2\} \\ \min_{w_H} E\{\|\varepsilon_H(n)\|^2\} = \min_{w_H} E\{\|s_H(n) - w_H^H x(n)\|^2\} \end{cases} \quad (3)$$

The weight vectors that minimize the corresponding mean square error (MSE), $E\{\|\varepsilon_V(n)\|^2\}$ and $E\{\|\varepsilon_H(n)\|^2\}$, are $$\begin{cases} w_{Vopt} = c_V R_X^{-1} v_V \\ w_{Hopt} = c_H R_X^{-1} v_H \end{cases} \quad (4)$$

where $$\begin{cases} v_V = E\{x(n) s_V^*(n)\} \\ v_H = E\{x(n) s_H^*(n)\} \end{cases} \quad (5)$$

$s_V(n)$, $s_H(n)$ are training signals, and $c_V$, $c_H$ are scaling factors.

Since most high-speed dual-polarization MW-MC radio communication systems are designed to have very short training intervals, efficient algorithms of adaptive XPIC are required to have extremely fast convergence rate.

To be utilized in high-speed dual-polarization MW-MC radio communication links, an adaptive XPIC algorithm should have a maximum convergence rate that is a minimum number of training samples consumed to achieve the required gain of XPI suppression. The convergence rate of an eligible adaptive algorithm should be independent of signal propagation conditions and parameters of cross-polarization interference, particularly of the channel matrix structure. In order to have the shortest time of actual adaptation, an eligible XPIC algorithm should be capable of implementation on faster ASIC-based fixed-point processors with standard data/operation formats.

A wide variety of simple trained or supervised adaptive searching algorithms can be roughly classified under the gradient-based least-mean-squares (LMS) and boot-strapped sub-category. An adaptive trained searching LMS algorithm that iteratively approaches the minimum MSE weight coefficients in equation (4) is described as:

$$\begin{cases} w_V(n+1) = w_V(n) + \mu_V \varepsilon_V(n) x(n) \\ w_H(n+1) = w_H(n) + \mu_H \varepsilon_H(n) x(n) \end{cases} \quad (6)$$

where $\varepsilon_V(n)$ and $\varepsilon_H(n)$ are the errors as defined in equation (3) and $\mu_V > 0$ and $\mu_H > 0$ are the step size factors. A schematic of the adaptive trained LMS algorithm 300 according to equation (6) is depicted in FIG. 3 where abbreviation WP stands for a weight processor.

The error-feedback LMS algorithms are known to be simple, tolerant to numerical errors and noise, and well-provided for implementation on real-time ASIC-based fixed-point processors. However, this gradient-based searching algorithm sub-category possesses a number of properties that throws serious obstacles in the way of its efficient application in adaptive trained XPI cancellers. Such disadvantages include a strong dependence of the algorithm's convergence rate upon parameters of cross-polarization interference. In practical cases, the number of training sample pairs required to obtain an acceptable gain of XPI suppression may vary from tens to hundreds. Disadvantages further include significant influence of the LMS algorithms on the main V- and H-channel subband responses caused by the adaptively controlled complex weights, $w_{11}$ and $w_{22}$; and sensitivity of both the algorithm's convergence performance and stability to spurious amplitude modulation of input signals.

The underlying idea of the adaptive trained bootstrap XPIC algorithms sub-category is to decorrelate output signals of a nonsingular 2×2 linear filter to achieve full separation of two different cross-interfering symbol streams by deep suppression of cross-polarized signal components. A block-diagram of a fast-convergent adaptive bootstrap (BS) algorithm 400 is presented in FIG. 4.

This algorithm adaptively updates the V- and H-polarization weights, $w_{21}$ and $w_{21}$ to null the output covariance $E\{y_V(n)y_H^*(n)\}$ according to the following iterative equations:

$$\begin{cases} w_{21}(n+1) = w_{21}(n) - \eta_V [y_V(n) - s_V(n)]^* y_H(n) \\ w_{12}(n+1) = w_{12}(n) - \eta_H [y_H(n) - s_H(n)]^* y_V(n) \end{cases} \quad (7)$$

where $\eta_V > 0$ and $\eta_H > 0$ are the step size factors. The supervised adaptive BS algorithm 400 is sometimes faster and simpler for implementation than the LMS algorithms. However, a detailed analysis of the adaptive bootstrapped algorithm performance and simulation results has shown that the convergence rate of the bootstrapped algorithms remains dependent upon the cross-polarization parameters. In practical cases, the number of training sample pairs required to obtain an acceptable gain of XPI suppression still counts tens to hundreds. Because of operation of raising to the third power, the adaptive bootstrapped algorithms span a significantly wider dynamic range of arithmetic operations that requires extension of arithmetic precision. The bootstrapped algorithm's convergence performance and stability remain sensitive to spurious amplitude modulation of input signals.

SUMMARY

It is the object of the invention to provide a fast and robust XPIC algorithm.

This object is achieved by the features of the independent claims. Further implementation forms are apparent from the dependent claims, the description and the figures.

The disclosure as described in the following presents an XPIC algorithm that optimizes both the V- and H-subband channel response with respect to the criterion of minimum variance distortionless response (MVDR). The disclosed XPIC algorithm provides fast convergence and stable performance. Each of two weights may be computed as the smoothed coefficient of linear regression (LR) of the corresponding output onto the crossed input by means of cross-correlation feedback loops.

The XPIC algorithm may be implemented as an adaptive trained XPIC algorithm based on linear regression. The adaptive trained XPIC algorithm presented hereinafter provides a fast convergence rate as the synthesised algorithm may achieve near-optimal levels of XPI suppression in about 4 to 8 training sample pairs. It further provides a short time interval of actual adaptation as the disclosed XPIC algorithm may update the two complex weights performing 12 real-valued multiplications and 4 real-valued divisions. The disclosed XPIC algorithm's convergence rate is insensitive to signal propagation conditions and parameters of XPI provided by the weight LR-estimates normalization property. The disclosed XPIC algorithm supports a minimum influence upon the main V- and H-channel subband responses supported by the weight constraints, $w_{11} = w_{22} = 1$. The convergence rate of the disclosed XPIC algorithm has a low sensitivity to spurious amplitude modulation of input signals provided by the LR-estimates normalization property. The disclosed XPIC algorithm is highly stable to processing errors, quantisation noise and precision limitations of fixed-point arithmetic supported by the cross-correlation feedback loops. The disclosed XPIC algorithm may be cost-effectively implemented on fast and cheap real-time ASIC-based fixed-point microprocessors.

In order to describe the invention in detail, the following terms, abbreviations and notations will be used:
  XPI: cross-polarization interference,
  XPIC: cross-polarization interference cancellation,
  MW: microwave,
  MC: multicarrier,
  V: vertical polarization component,
  H: horizontal polarization component
  AWGN: additive white Gaussian noise,
  MSE: mean square error,
  MMSE: minimum mean square error,
  WP: weight processor,
  LMS: least-mean-squares,
  ASIC: application-specific integrated circuit,
  BS: bootstrap,
  LR: linear regression,
  MVDR: minimum variance distortionless response.

According to a first aspect, the invention relates to a method for cross-polarization interference power suppression in dual-polarization radio communication systems, the method comprising: filtering a vertical polarization component $x_V(n)$ and a horizontal polarization component $x_H(n)$ of a received dual-polarization channel signal by a 2×2 channel weights matrix W; and determining the 2×2 channel weights matrix W based on a minimum variance distortionless response criterion.

By filtering the vertical and horizontal polarized components with a channel weights matrix which is computed based on an MVDR criterion a fast and robust XPIC algorithm is provided.

In a first possible implementation form of the method according to the first aspect, the minimum variance distortionless response criterion is based on minimizing cross-polarization interfering components of the 2×2 channel weights matrix W.

When minimizing cross-polarization interfering components of the 2×2 channel weights matrix W, the XPIC provides a fast convergence rate as the algorithm achieves near-optimal levels of XPI suppression.

In a second possible implementation form of the method according to the first aspect as such or according to the first implementation form of the first aspect, the minimum variance distortionless response criterion is based on using a covariance matrix $R_x$ of the received dual-polarization channel signal.

A covariance matrix $R_x$ of the received dual-polarization channel signal can be easily computed, the computational efficiency of such an algorithm is high.

In a third possible implementation form of the method according to the second implementation form of the first aspect, the minimum variance distortionless response criterion is according to:

$$\begin{cases} \min_{w_V} w_V^H R_X w_V & \text{subject to } w_V^H H s = h_{11} s_V \\ \min_{w_H} w_H^H R_X w_H & \text{subject to } w_H^H H s = h_{22} s_H \end{cases},$$

where $w_V$ and $W_H$ represent a vertical and a horizontal polarization component, respectively, of the 2×2 channel weights matrix W, $R_x$ represents the covariance matrix of the received dual-polarization channel signal, H represents a 2×2 channel matrix of a communication channel, s represents an input signal to that communication channel, $h_{11}$ and $h_{22}$ represent a first and a second diagonal element, respectively, of that communication channel and $s_V$ and $s_H$ represent a vertical and a horizontal polarization component, respectively, of the input signal.

By using that relation, the method supports a minimum influence upon the main V- and H-channel subband responses.

In a fourth possible implementation form of the method according to the third implementation form of the first aspect, a first $w_{21MVDR}$ and a second $w_{12MVDR}$ off-diagonal channel weight coefficient of the 2×2 channel weights matrix W is determined according to:

$$\begin{cases} w_{21MVDR} = -\dfrac{a_H^2 h_{12}^* h_{22}}{a_H^2 |h_{22}|^2 + a_V^2 |h_{21}|^2} \\ w_{12MVDR} = -\dfrac{a_V^2 h_{21}^* h_{11}}{a_V^2 |h_{11}|^2 + a_H^2 |h_{12}|^2} \end{cases},$$

where $h_{11}$, $h_{12}$, $h_{21}$ and $h_{22}$ represent coefficients of the 2×2 communication channel, $a_V^2$ and $a_H^2$ represent a power of the vertical polarization component and the horizontal polarization component of the input signal, respectively.

Such a calculation can be easily implemented by standard multiplying, adding and division units.

In a fifth possible implementation form of the method according to the first aspect as such or according to any of the previous implementation forms of the first aspect, the method comprises: determining the 2×2 channel weights matrix W based on an input signal comprising sequences of known symbols.

By using input signals including known symbols or training symbols, the method may provide a maximum convergence rate at a minimum number of training samples consumed to achieve a required gain of XPI suppression.

In a sixth possible implementation form of the method according to the fifth implementation form of the first aspect, the method comprises: determining the 2×2 channel weights matrix W based on linear regression of a vertical and a horizontal polarization component of the 2×2 channel weights matrix W.

By using linear regression, structures of the method can be implemented in a simple manner. An accuracy of the method can be efficiently adjusted by a number of regressions.

In a seventh possible implementation form of the method according to the sixth implementation form of the first aspect, a first $w_{21LR}(n)$ and a second $w_{12LR}(n)$ off-diagonal channel weight coefficient of the 2×2 channel weights matrix W is determined according to:

$$\begin{cases} w_{21LR}(n) = -\dfrac{\sum_{i=1}^{n} [x_V(i) - s_V(i)]^* y_H(i)}{\sum_{i=1}^{n} |x_H(i)|^2} \\ w_{12LR}(n) = -\dfrac{\sum_{i=1}^{n} [x_H(i) - s_H(i)]^* y_V(i)}{\sum_{i=1}^{n} |x_V(i)|^2} \end{cases} \quad n = 1, \ldots, N_t,$$

where $x_V$ and $x_H$ represent a vertical and a horizontal polarization component, respectively, of the received channel signal, $s_V$ and $s_H$ represent a vertical and a horizontal polarization component, respectively, of the input signal, $y_V(i)$ and $y_H(i)$ represent a vertical and a horizontal polarization component, respectively, of the received channel signal filtered by the channel weights matrix and n represents a sequence identifier of the sequences of known symbols comprised in the input signal.

Such a calculation of the 2×2 channel weights matrix W can be easily implemented by standard multipliers, adders and dividers, and thus on a low complexity fixed-point processor.

According to a second aspect, the invention relates to a cross-polarization interference canceller, comprising: a filtering unit configured to filter a vertical polarization component $x_V(n)$ and a horizontal polarization component $x_H(n)$ of a received dual-polarization channel signal by a 2×2 channel weights matrix W; and a weight processor configured to determine the 2×2 channel weights matrix W based on a minimum variance distortionless response criterion.

Such a cross-polarization interference canceller provides a fast convergence rate. It further provides a short time interval of actual adaptation.

In a first possible implementation form of the cross-polarization interference canceller according to the second aspect, the filtering unit comprises two parallel arms of a same structure spanned by cross-correlation feedback loops.

The cross-polarization interference canceller is highly stable to processing errors, quantisation noise and precision limitations of fixed-point arithmetic supported by the cross-correlation feedback loops. The disclosed XPIC algorithm may be cost-effectively implemented on fast and cheap real-time ASIC-based fixed-point microprocessors.

In a second possible implementation form of the cross-polarization interference canceller according to the second aspect as such or according to the first implementation form of the second aspect, the cross-polarization interference canceller is configured to operate in a training mode and in a working mode.

Such a cross-polarization interference canceller provides a fast convergence rate as the synthesised algorithm may achieve near-optimal levels of XPI suppression in about 4 to 8 training sample pairs.

In a third possible implementation form of the cross-polarization interference canceller according to second implementation form of the second aspect, the cross-polarization interference canceller is configured to update channel weights $w_{21LR}(n)$ and $W_{12LR}(n)$ of the 2×2 channel weights matrix W in the training mode by using $N_t$ pairs of prescribed training sample sequences according to:

$$\begin{cases} w_{21LR}(n) = -\dfrac{\sum_{i=1}^{n}[x_V(i) - s_V(i)]^* y_H(i)}{\sum_{i=1}^{n}|x_H(i)|^2} \\ w_{12LR}(n) = -\dfrac{\sum_{i=1}^{n}[x_H(i) - s_H(i)]^* y_V(i)}{\sum_{i=1}^{n}|x_V(i)|^2} \end{cases} n = 1, \ldots, N_t,$$

where $x_V(i)$ and $x_H(i)$ represent a vertical and a horizontal polarization component, respectively, of the received channel signal in response to an ith pair of the training sample sequences, $s_V(i)$ and $s_H(i)$ represent a vertical and a horizontal polarization component, respectively, of an ith pair of the training sample sequences, $y_V(i)$ and $y_H(i)$ represent a vertical and a horizontal polarization component, respectively, of the received channel signal filtered by the channel weights matrix and n represents a sequence identifier of the Nt pairs of prescribed training sample sequences.

The convergence rate of such a canceller is insensitive to signal propagation conditions and parameters of XPI provided by the weight LR-estimates normalization property. The cross-polarization interference canceller supports a minimum influence upon the main V- and H-channel subband responses supported by the weight constraints, $w_{11}=w_{22}=1$. The convergence rate has a low sensitivity to spurious amplitude modulation of input signals provided by the LR-estimates normalization property.

In a fourth possible implementation form of the cross-polarization interference canceller according to any of the second and third implementation forms of the second aspect, the cross-polarization interference canceller is configured to filter the received channel signal in the working mode by the channel weights matrix as processed during the training mode.

Using working mode and training mode gives a high degree of flexibility. The weights may be processed as needed.

In a fifth possible implementation form of the cross-polarization interference canceller according to the second aspect as such or according to any of the preceding implementation forms of the second aspect, the cross-polarization interference canceller comprises at least one of a digital signal processor and a fixed-point ASIC based microprocessor, configured to implement at least one of the filtering unit and the weight processor.

The disclosed XPIC algorithm may be cost-effectively implemented on fast and cheap real-time ASIC-based fixed-point microprocessors or on standard DSPs.

According to a third aspect, the invention relates to a computer program product comprising a readable storage medium storing program code thereon for use by a computer, the program code comprising: instructions for filtering a vertical polarization component $x_V(n)$ and a horizontal polarization component $x_H(n)$ of a received dual-polarization channel signal by a 2×2 channel weights matrix W; and instructions for determining the 2×2 channel weights matrix W based on a minimum variance distortionless response criterion.

The computer program may be loaded to each ASIC or DSP. Parameters of the XPIC algorithm can be changed or adapted on system startup or at run-time as needed.

According to a fourth aspect, the invention relates to a method of adaptive trained cross-polarization interference (XPI) power suppression in dual-polarization microwave (MW) multicarrier (MC) radio communication systems based on application of the linear-constrained minimum variance distortionless response (MVDR) criterion.

According to a fifth aspect, the invention relates to a new fast robust algorithm of adaptive trained XPI cancellation (XPIC) in dual-polarization MW-MC radio communication systems designed basing on the linear regression (LR) estimation of optimal weight coefficients by making use of input-output cross-correlation feedback loops.

Such an XPIC algorithm provides a fast convergence rate due to the short time interval of actual adaptation. The XPIC algorithm's convergence rate is insensitive to signal propagation conditions and parameters of XPI.

According to a sixth aspect, the invention relates to a structure of a cost-effective real-time digital signal processor to implement the new algorithm of adaptive trained XPIC.

The structure can be implemented by standard processing units such as multiply and add units resulting in a low computational complexity.

In a first possible implementation form of the structure of a cost-effective real-time digital signal processor according to the sixth aspect, the new algorithm is implemented on fixed-point ASIC-based microprocessors with standard data/operation word-lengths.

Such microprocessors are widely-used and may be applied for cost efficient implementation of the new XPIC algorithm.

BRIEF DESCRIPTION OF THE DRAWINGS

Further embodiments of the invention will be described with respect to the following figures, in which.

DETAILED DESCRIPTION OF EMBODIMENTS

In the following detailed description, reference is made to the accompanying drawings, which form a part thereof, and in which is shown by way of illustration specific aspects in which the disclosure may be practiced. It is understood that other aspects may be utilized and structural or logical changes may be made without departing from the scope of the present disclosure. The following detailed description, therefore, is not to be taken in a limiting sense, and the scope of the present disclosure is defined by the appended claims.

The devices and methods described herein may be based on cross-polarization interference power suppression and cross-polarization interference power cancellation. It is understood that comments made in connection with a described method may also hold true for a corresponding device configured to perform the method and vice versa. For example, if a specific method step is described, a corresponding device may include a unit to perform the described method step, even if such unit is not explicitly described or illustrated in the figures. Further, it is understood that the features of the various exemplary aspects described herein may be combined with each other, unless specifically noted otherwise.

The methods and devices described herein may be implemented in wireless communication networks, in particular communication networks based on 3G, 4G and CDMA standards. The methods and devices described below may further be implemented in a base station (NodeB, eNodeB) or a mobile device (or mobile station or User Equipment (UE)). The described devices may include integrated circuits and/or passives and may be manufactured according to various technologies. For example, the circuits may be designed as logic integrated circuits, analog integrated circuits, mixed signal integrated circuits, optical circuits, memory circuits and/or integrated passives.

The methods and devices described herein may receive radio signals. Radio signals or microwaves may be or may include radio frequency signals radiated by a radio transmitting device (or radio transmitter or sender) with a radio frequency lying in a range of about 3 Hz to about 300 GHz. The frequency range may correspond to frequencies of alternating current electrical signals used to produce and detect radio waves.

Figure 1:
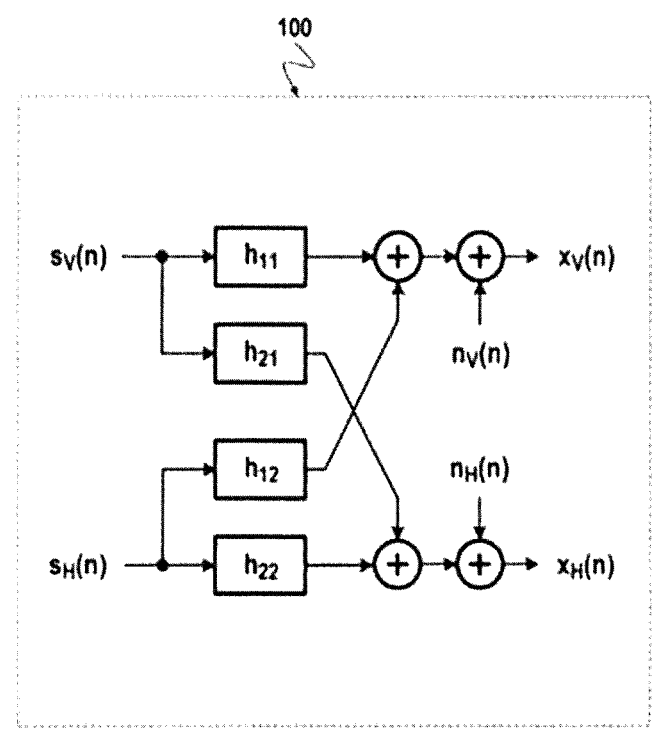
FIG. 1 shows a block diagram illustrating a channel model 100 of an elementary two-input-two-output (2×2) subband XPI canceller.
Figure 2:
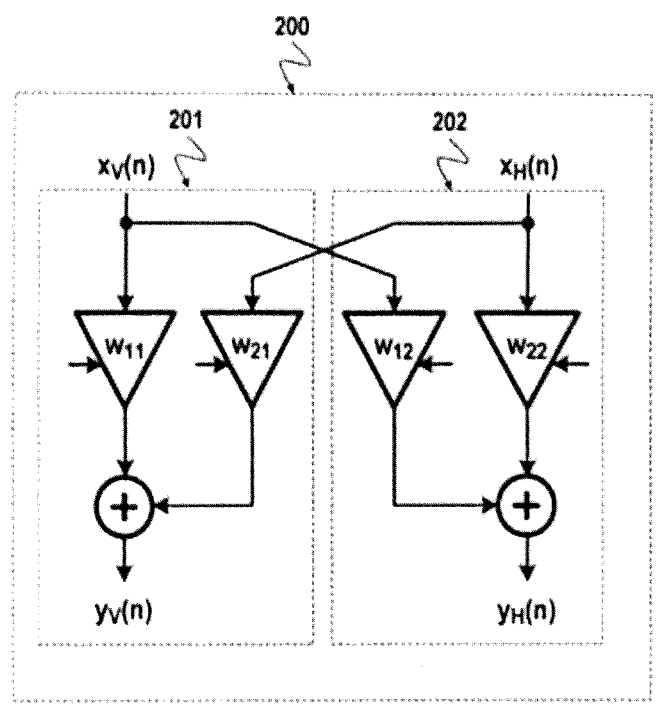
FIG. 2 shows a block diagram illustrating the structure of a 2×2 linear XPI canceller 200.
Figure 3:
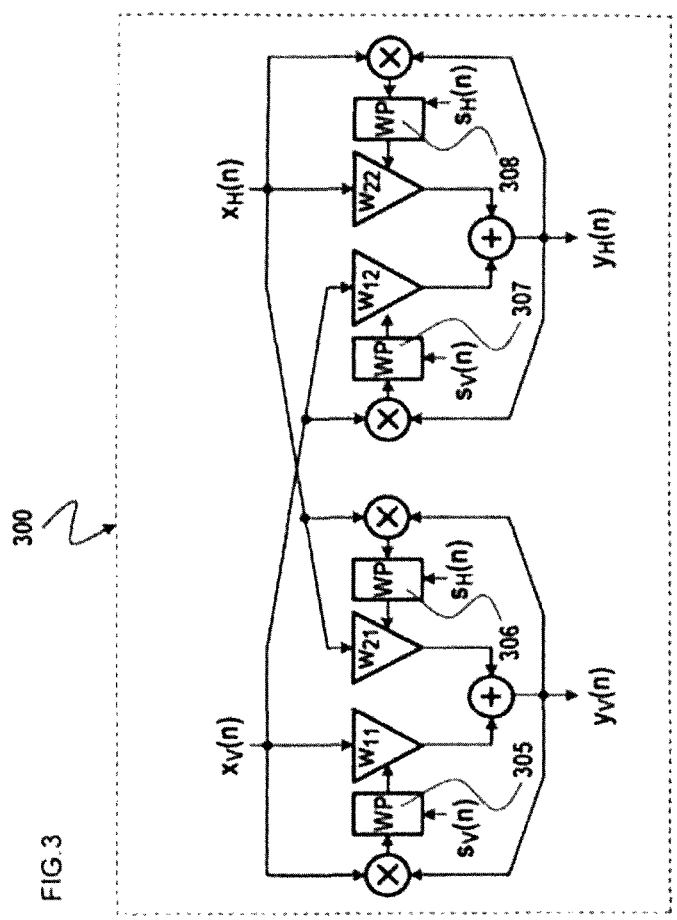
FIG. 3 shows a block diagram illustrating an adaptive trained searching LMS algorithm 300.
Figure 4:
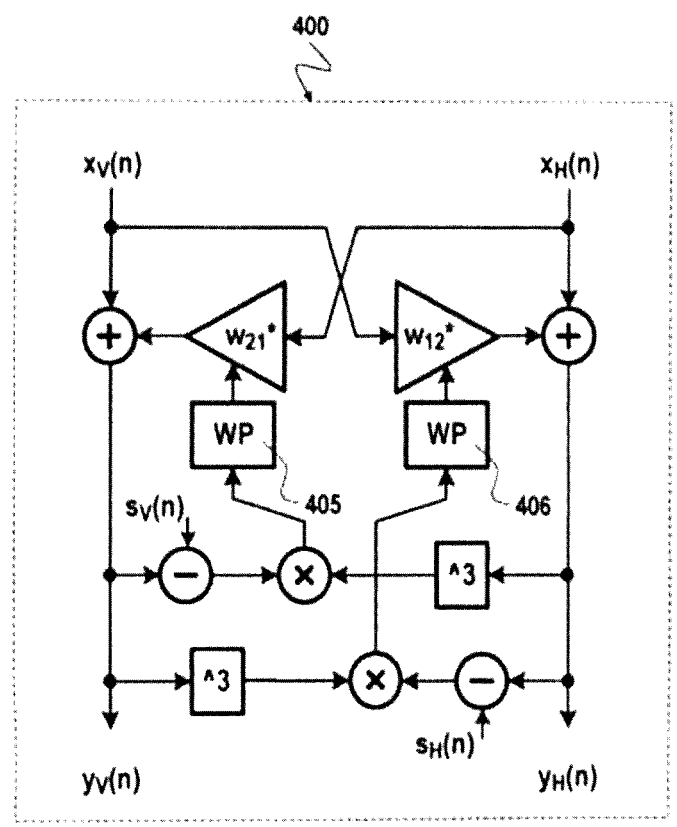
FIG. 4 shows a block diagram illustrating a fast-convergent adaptive bootstrap (BS) algorithm 400.
Figure 5:
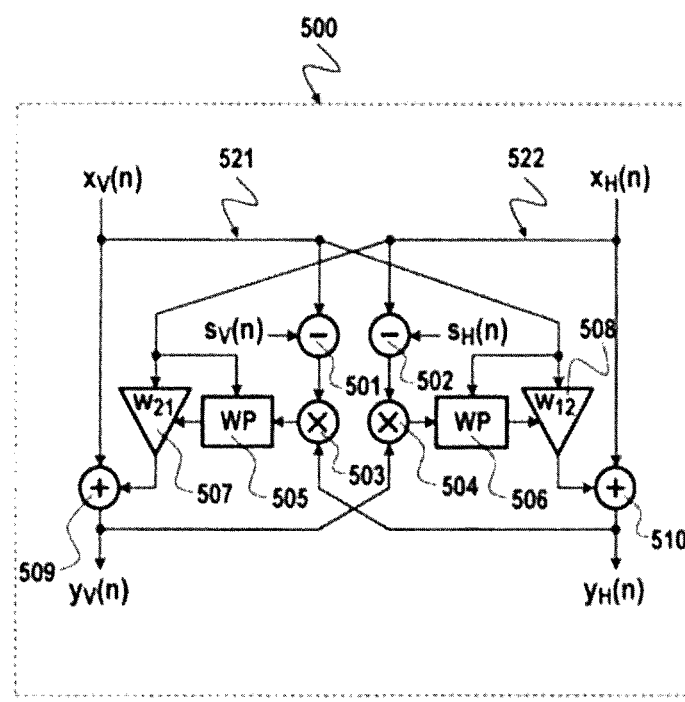
FIG. 5 shows a block-diagram illustrating a digital processor 500 that implements an adaptive trained XPIC algorithm according to an implementation form.

FIG. 5 shows a block-diagram illustrating a digital processor 500 that implements an adaptive trained XPIC algorithm according to an implementation form. The digital processor 500 may include two cross-feedback loops 521, 522. The first cross-feedback loop 521 may include a first weighting processor 505, a first subtracting unit 501, a first adding unit 509, a first correlation multiplier 503 and a first weighting filter 507. The second cross-feedback loops 522 may include a second weighting processor 506, a second subtracting unit 502, a second adding unit 510, a second correlation multiplier 504 and a second weighting filter 508.

The concept of the new fast robust cost-effective algorithm of real-time adaptive trained XPI cancellation lies in application of the MVDR criterion to optimize the canceller configuration, and by making use of the LR method to perform cyclic update of the canceller's weights 507, 508. In application to this two-dimensional problem, the MVDR criterion can be formulated as $$\begin{cases} \min_{w_V} w_V^H R_X w_V \text{ subject to } w_V^H H s = h_{11} s_V \\ \min_{w_H} w_H^H R_X w_H \text{ subject to } w_H^H H s = h_{22} s_H \end{cases} \quad (8)$$

where $$R_X = R_S + R_N = E\{s(n)s^H(n)\} + E\{n(n)n^H(n)\} \quad (9)$$

is the input covariance matrix, $R_S$ and $R_N$ is the input signal and noise covariance matrix, correspondingly.

Solving the problem of equation (8) by conventional variational methods in supposition that the V- and H-arm weight coefficients are such that $w_{11}=w_{22}=1$, results in the following optimum cross weights, which null the two cross-polarization interfering components:

$$\begin{cases} w_{21MVDR} = -\dfrac{a_H^2 h_{12}^* h_{22}}{a_H^2 |h_{22}|^2 + a_V^2 |h_{21}|^2} \\ w_{12MVDR} = -\dfrac{a_V^2 h_{21}^* h_{11}}{a_V^2 |h_{11}|^2 + a_H^2 |h_{12}|^2} \end{cases} \quad (10)$$

where $a_{V(H)}^2$ denotes the corresponding signal average power.

From here it can be seen that in order to suppress the XPI components at least the off-diagonal entries of the channel matrix H must be known a priory that, in most practical cases, is impossible. By introducing a particular type of training mode, the optimum weight coefficients in equation (10) can be effectively estimated by making use of the LR-method.

If the V- and H-channel training symbol packets, $\{s_V(n)\}$ and $\{s_H(n)\}$, n=1, ... , $N_t$, are known beforehand then the two following auxiliary sequences can be composed:

$$x_t(n) = \begin{bmatrix} x_{Vt}(n) \\ x_{Ht}(n) \end{bmatrix} = \begin{bmatrix} x_V(n) - s_V(n) \\ x_H(n) - s_H(n) \end{bmatrix} \cong \begin{bmatrix} h_{12} s_H(n) + n_V(n) \\ h_{21} s_V(n) + n_H(n) \end{bmatrix}, \quad (11)$$

$$n = 1, 2, \ldots , N_t$$

where $N_t$ is the number of training signal pairs.

Since the V- and H-polarization outputs of the canceller become independent to each other the LR-estimators of the optimum XPIC weights can be approximated as.

$$\begin{cases} w_{21LR} = -\lim\limits_{N_t \to \infty} \dfrac{E\{x_{Vt}^*(n) x_H(n)\}}{E\{|x_H(n)|^2\}} = -\dfrac{a_H^2 h_{12}^* h_{22}}{a_H^2 |h_{22}|^2 + a_V^2 |h_{21}|^2 + \sigma_{NH}^2} \\ w_{12LR} = -\lim\limits_{N_t \to \infty} \dfrac{E\{x_{Ht}^*(n) x_V(n)\}}{E\{|x_V(n)|^2\}} = -\dfrac{a_V^2 h_{21}^* h_{11}}{a_V^2 |h_{11}|^2 + a_H^2 |h_{12}|^2 + \sigma_{NV}^2} \end{cases} \quad (12)$$

where $a_V^2$ and $a_H^2$ is the average symbol power in the V- and H-polarization channel, correspondingly, and $\sigma_{NV}^2 = \sigma_{NH}^2 = \sigma_N^2$ is the noise variance.

Thus, a basic version of the new fast robust supervised adaptive XPIC algorithm synthesized using the LR-estimation method can be described as:

$$\begin{cases} w_{21LR}(n) = -\dfrac{\sum\limits_{i=1}^{n} [x_V(i) - s_V(i)]^* y_H(i)}{\sum\limits_{i=1}^{n} |x_H(i)|^2} \\ w_{12LR}(n) = -\dfrac{\sum\limits_{i=1}^{n} [x_H(i) - s_H(i)]^* y_V(i)}{\sum\limits_{i=1}^{n} |x_V(i)|^2} \end{cases} \quad n = 1, \ldots , N_t \quad (13)$$

where

-continued $$\begin{cases} y_V(i) = x_V(i) + w_{21}^*(i-1)x_H(i) \\ y_H(i) = x_H(i) + w_{12}^*(i-1)x_V(i) \end{cases}, i = 1, \ldots, n \quad (14)$$

The canceller of FIG. 5 may be built as a digital signal processor 500 to contain two parallel arms 521, 533 of the same structure spanned by cross-correlation feedback loops. The processor 500 may be designed to operate in two main modes, the training and working mode. In the training mode, the canceller 500 may update and smooth the weights $w_{21}(n)$ 507 and $w_{12}(n)$ 508 according to equation (13) using $N_t$ pairs of prescribed training sample sequences, $\{s_{V_t}(n)\}$ and $\{s_{H_t}(n)\}$. Over the end of each training signal packet, the weights 507, 508 may be frozen and kept constant up to the next training interval. In the working mode, the subtracting units 501, 502, correlation multipliers 503, 504 and weight processors 505, 506 of each cross-feedback loop 521, 522 may be switched off so that the canceller 500 may form its outputs, $y_V$ and $y_H$ with suppressed XPIs using constant frozen weights.

In one example, a cross-polarization interference canceller may include a filtering unit 507, 508 configured to filter a vertical polarization component $x_V(n)$ and a horizontal polarization component $x_H(n)$ of a received dual-polarization channel signal by a 2×2 channel weights matrix W that may include the weights $w_{11}=1$, $w_{12}$, $w_{21}$, $w_{22}=1$. The XPIC may further include a weight processor 505, 506 configured to determine the 2×2 channel weights matrix W based on a minimum variance distortionless response criterion.

In an implementation form of the cross-polarization interference canceller, the filtering unit 507, 508 may include two parallel arms of a same structure spanned by cross-correlation feedback loops 521, 522. In an implementation form, the cross-polarization interference canceller may operate in a training mode and in a working mode. In an implementation form, the cross-polarization interference canceller may update channel weights $w_{21LR}(n)$ and $w_{12LR}(n)$ of the 2×2 channel weights matrix W in the training mode by using $N_t$ pairs of prescribed training sample sequences according equation (13) as described above. In an implementation form, the cross-polarization interference canceller may filter the received channel signal in the working mode by the channel weights matrix as processed during the training mode. In an implementation form, the cross-polarization interference canceller may include at least one of a digital signal processor and a fixed-point ASIC based microprocessor, configured to implement at least one of the filtering unit 507, 508 and the weight processor 505, 506.

Figure 6:
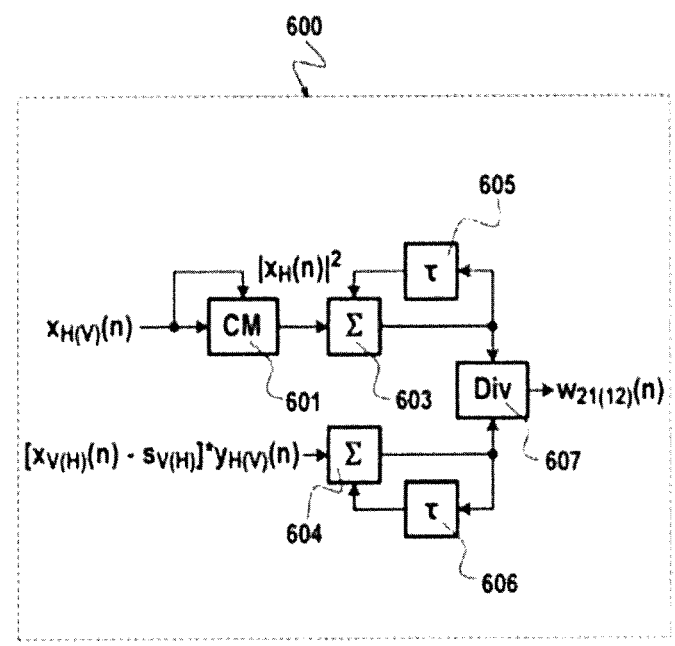
FIG. 6 shows a block-diagram of a digital weight processor (WP) 600 according to an implementation form.

FIG. 6 shows a block-diagram of a digital weight processor (WP) 600 according to an implementation form. The digital weight processor 600 may include a complex valued multiplier 601, a first 603 and a second 604 integrating summer, a first 605 and a second 606 delay unit and a real valued division unit 607.

The digital weight processor 600 may completely implement the computing and smoothing operations of the new adaptive XPIC algorithm as described above with respect to FIG. 5. The abbreviation CM indicates a complex-valued multiplier, Σ stands for an integrating summer, symbol τ implies a delay unit, e.g. a shift-register, and abbreviation Div indicates a real-valued division unit.

As follows from the schematic, the digital weight processor 600 may perform two operations of real-valued multiplication to obtain the instant value of the input variance $|x_H(V)(n)|^2$ in the CM 601, and two operations of real-valued divisions to form the resultant value of updated weight $w_{21(12)}(n)$ in the Div unit 607.

The smoothing, i.e. recurrent integration operation may be realized in the WP 600 by making use of the standard summing shift-register. Due to the division operation, the numerator and denominator do not need a normalization at integration. As a result, the total amount $N_{M\&D}$ of real-valued multiplications $N_{Mu}$ and divisions $N_{Div}$ required to process a pair of training samples with the new LR-based algorithm of adaptive XPIC may be $N_{M\&D}=N_{Mu}+N_{Div}=16$ in one example.

FIGS. 7 to 10 show performance diagrams of an adaptive trained XPIC algorithm according to an implementation form.

In order to figure out the convergence performance of the new adaptive trained XPIC algorithm as described above with respect to FIGS. 5 and 6, computer simulations were performed. The microwave link parameters and conditions that were used in the simulations are depicted in table 1.

TABLE 1

| microwave link parameters for testing the new adaptive trained XPIC algorithm | |
|---|---|
| Link distance | 5000 m |
| Carrier frequency | 73 GHz |
| Bandwidth | 5 GHz |
| Overall noise factor | 6 dBm |
| Tx and Rx antenna aperture size | 0.6 m |
| Antenna efficiency | 58% |
| RF-IF Tx and Rx losses | 3 dBm |
| V and H-channel transmitted power | 10 dBm |
| V and H-channel received symbol power regarding to the noise floor | 23.2 dB |

A channel model was assumed to be a 2-polarization variation to the conventional LoS-plus-AWGN model of subband OFDM signal propagation. According to the model, all possible signal amplitude-phase distortions, spurious refractions, cross-polarization interference and etc, have been modeled by channel matrix H.

To perform trustworthy testing of the convergence performance a set of rather hard conditions of data transmission was taken into consideration. Particularly, all the input signals, both the direct components and cross-polarization leakage contributions, were assumed to be in-phase to each other not having any inter-channel and inter-component phase shifts. The pilot-signals were modeled by two independent random 32-sample QPSK symbol sequences.

FIG. 7 to FIG. 10 show one-snapshot learning curves of the new adaptive trained LR-based XPI canceller obtained for asymmetric cross-channel leakage scenarios when the V-to-H power leakage level remains equal to −25 dB while the H-to-V leakage varies from −13 dB up to −22 dB.

Figure 7:
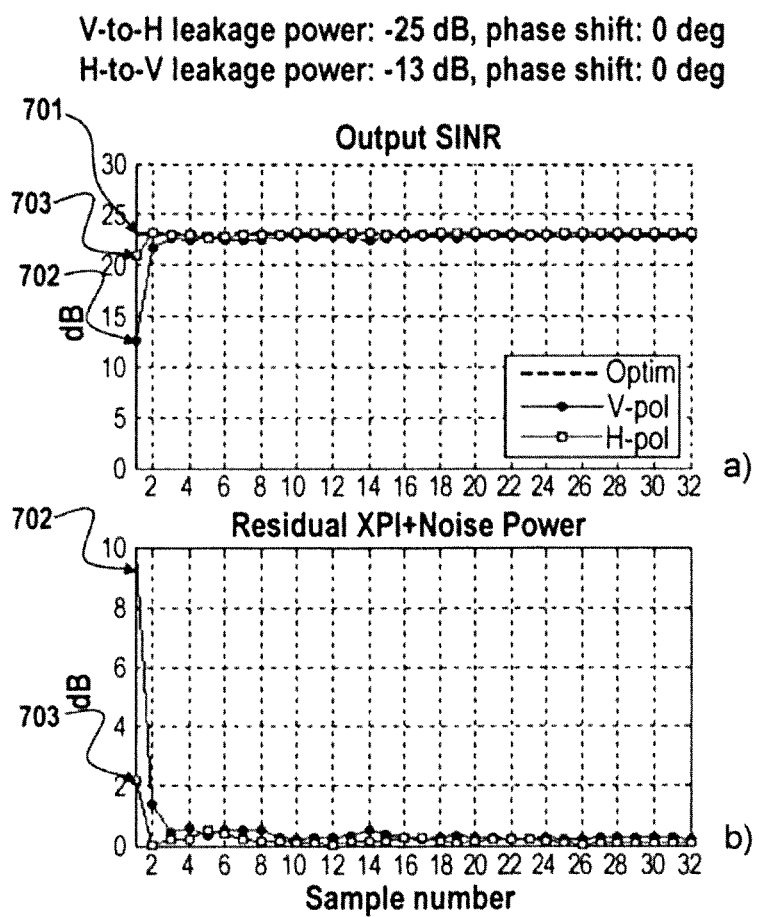
FIGS. 7 to 10 show performance diagrams of an adaptive trained XPIC algorithm according to an implementation form.

FIG. 7 illustrates output signal to interference and noise (SINR) (FIG. 7a) and residual XPI and noise power (FIG. 7b) over samples for a V-to-H leakage power of −25 dB at zero phase shift and a H-to-V leakage power of −13 dB at zero phase shift. The graphs show the V-polarization component 702, the H-polarization component 703 and the optimum 701.

Figure 8:
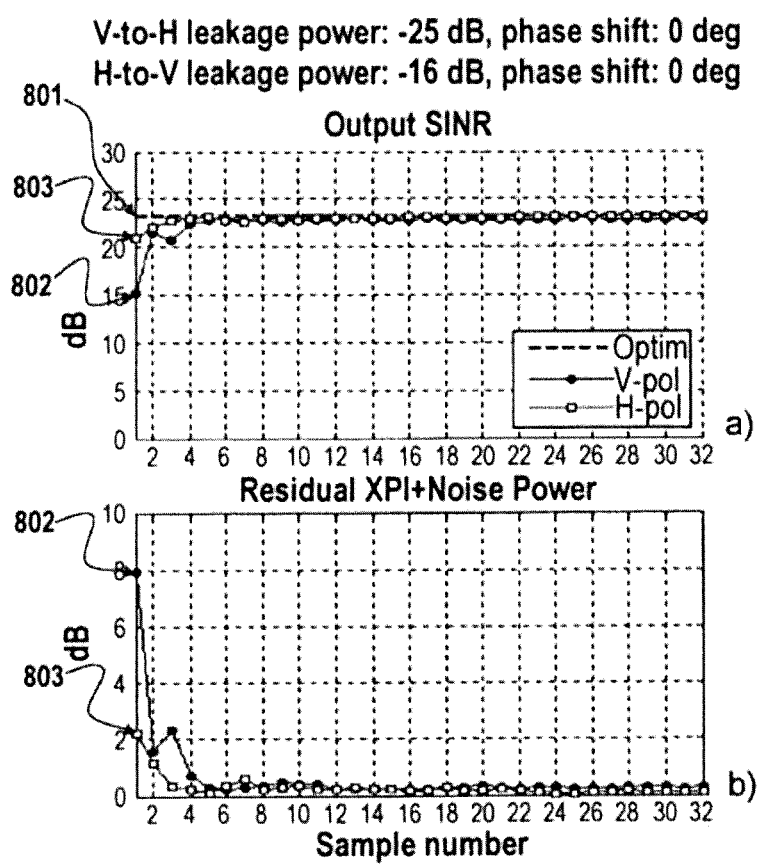

FIG. 8 illustrates output signal to interference and noise (SINR) (FIG. 8a) and residual XPI and noise power (FIG. 8b) over samples for a V-to-H leakage power of −25 dB at zero phase shift and a H-to-V leakage power of −16 dB at zero phase shift. The graphs show the V-polarization component 802, the H-polarization component 803 and the optimum 801.

Figure 9:
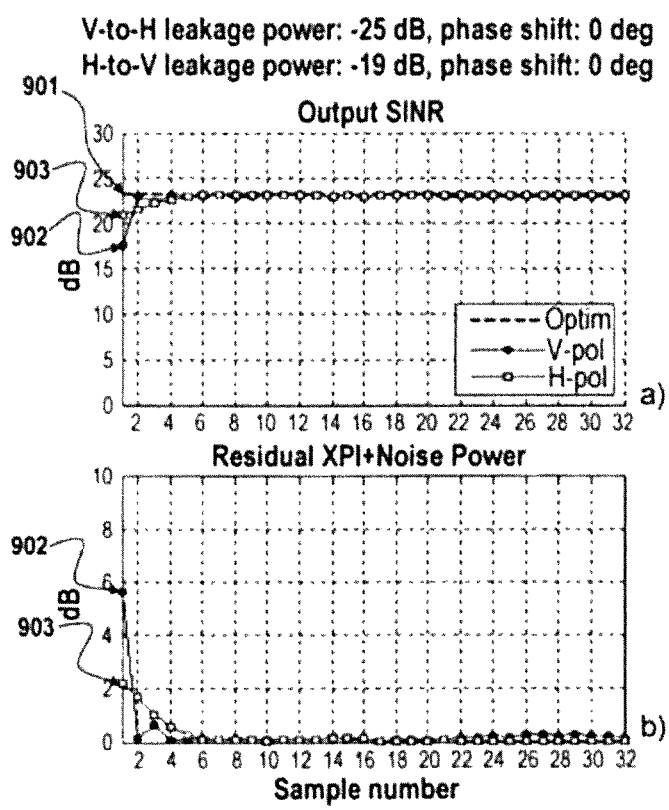

FIG. 9 illustrates output signal to interference and noise (SINR) (FIG. 9a) and residual XPI and noise power (FIG. 9b) over samples for a V-to-H leakage power of −25 dB at zero phase shift and a H-to-V leakage power of −19 dB at zero phase shift. The graphs show the V-polarization component 902, the H-polarization component 903 and the optimum 901.

Figure 10:
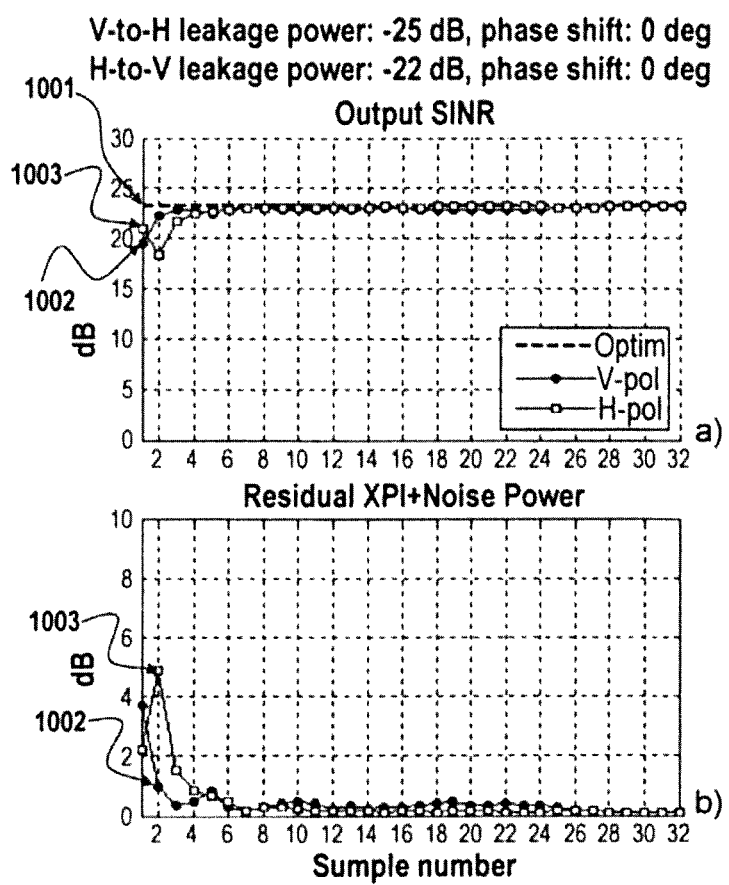

FIG. 10 illustrates output signal to interference and noise (SINR) (FIG. 10a) and residual XPI and noise power (FIG. 10b) over samples for a V-to-H leakage power of −25 dB at zero phase shift and a H-to-V leakage power of −22 dB at zero phase shift. The graphs show the V-polarization component 1002, the H-polarization component 1003 and the optimum 1001.

From the graphs it is evident that the minimum number of training sample pairs required to reach acceptable levels of XPI suppression does not exceed 4÷8 without regard to the cross-polarization leakage power levels.

Figure 11:
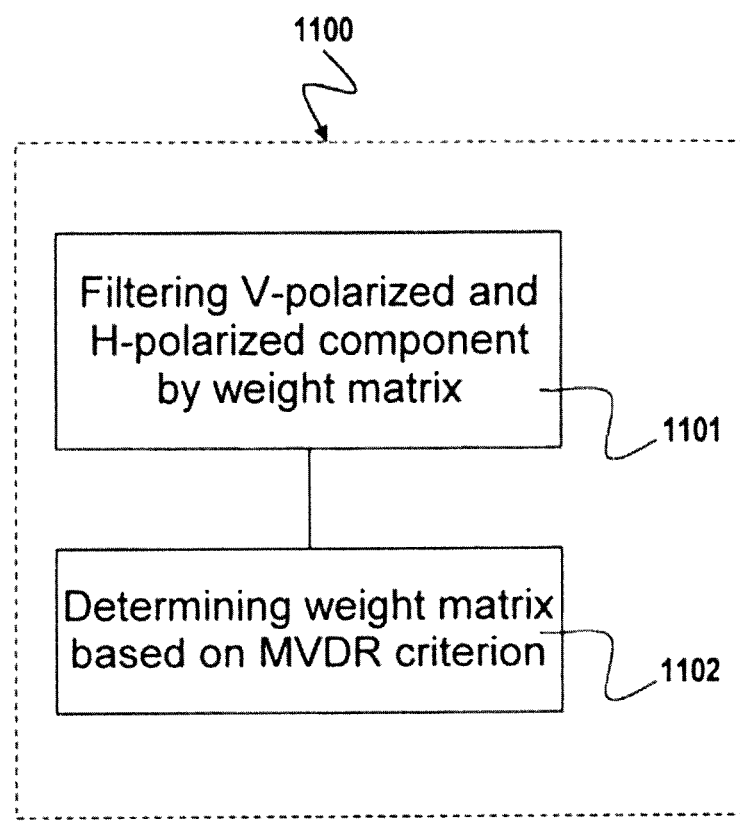
FIG. 11 shows a schematic diagram illustrating one example of a method 1100 for cross-polarization interference power suppression.

FIG. 11 shows a schematic diagram illustrating one example of a method 1100 for cross-polarization interference power suppression.

The method 1100 may include filtering a vertical polarization component $x_V(n)$ and a horizontal polarization component $x_H(n)$ of a received dual-polarization channel signal by a 2×2 channel weights matrix W; and determining the 2×2 channel weights matrix W based on a minimum variance distortionless response criterion.

In an implementation form, the minimum variance distortionless response criterion may be based on minimizing cross-polarization interfering components of the 2×2 channel weights matrix W. In an implementation form, the minimum variance distortionless response criterion may be based on using a covariance matrix $R_x$ of the received dual-polarization channel signal. In an implementation form, the minimum variance distortionless response criterion may be according to equation (8) as described above with respect to FIG. 5. In an implementation form, a first $w_{21MVDR}$ and a second $W_{12MVDR}$ off-diagonal channel weight coefficient of the 2×2 channel weights matrix W may be determined according to equation (10) as described above with respect to FIG. 5. In an implementation form, the method 1100 may include determining the 2×2 channel weights matrix W based on an input signal including sequences of known symbols, e.g. training symbols or pilot symbols. In an implementation form, the method 1100 may include determining the 2×2 channel weights matrix W based on linear regression of a vertical and a horizontal polarization component of the 2×2 channel weights matrix W. In an implementation form, a first $w_{21LR}(n)$ and a second $w_{12LR}(n)$ off-diagonal channel weight coefficient of the 2×2 channel weights matrix W is determined according to equation (13) as described above with respect to FIG. 5.

The method 1100 may be used to operate a digital processor 500 and/or a digital weight processor 600 as described above with respect to FIGS. 5 and 6.

The methods, systems and devices described herein may be implemented as software in a Digital Signal Processor (DSP), in a micro-controller or in any other side-processor or as hardware circuit within an application specific integrated circuit (ASIC).

The invention can be implemented in digital electronic circuitry, or in computer hardware, firmware, software, or in combinations thereof, e.g. in available hardware of conventional mobile devices or in new hardware dedicated for processing the methods described herein.

The present disclosure also supports a computer program product including computer executable code or computer executable instructions that, when executed, causes at least one computer to execute the performing and computing steps described herein, in particular the method 1100 as described above with respect to FIG. 11 and the XPIC algorithms described above with respect to FIGS. 5 to 10. Such a computer program product may include a readable storage medium storing program code thereon for use by a computer, the program code may include instructions for filtering a vertical polarization component $x_V(n)$ and a horizontal polarization component $x_H(n)$ of a received dual-polarization channel signal by a 2×2 channel weights matrix W, as described above with respect to FIGS. 5 and 6; and instructions for determining the 2×2 channel weights matrix W based on a minimum variance distortionless response criterion, as described above with respect to FIGS. 5 and 6.

While a particular feature or aspect of the disclosure may have been disclosed with respect to only one of several implementations, such feature or aspect may be combined with one or more other features or aspects of the other implementations as may be desired and advantageous for any given or particular application. Furthermore, to the extent that the terms "include", "have", "with", or other variants thereof are used in either the detailed description or the claims, such terms are intended to be inclusive in a manner similar to the term "comprise". Also, the terms "exemplary", "for example" and "e.g." are merely meant as an example, rather than the best or optimal.

Although specific aspects have been illustrated and described herein, it will be appreciated by those of ordinary skill in the art that a variety of alternate and/or equivalent implementations may be substituted for the specific aspects shown and described without departing from the scope of the present disclosure. This application is intended to cover any adaptations or variations of the specific aspects discussed herein.

Although the elements in the following claims are recited in a particular sequence with corresponding labeling, unless the claim recitations otherwise imply a particular sequence for implementing some or all of those elements, those elements are not necessarily intended to be limited to being implemented in that particular sequence.

Many alternatives, modifications, and variations will be apparent to those skilled in the art in light of the above teachings. Of course, those skilled in the art readily recognize that there are numerous applications of the invention beyond those described herein. While the present inventions has been described with reference to one or more particular embodiments, those skilled in the art recognize that many changes may be made thereto without departing from the scope of the present invention. It is therefore to be understood that within the scope of the appended claims and their equivalents, the invention may be practiced otherwise than as specifically described herein.

What is claimed is:

1. A cross-polarization interference canceller, comprising:
a memory; and
a processor coupled to the memory and configured to:
receive a dual-polarization channel signal over a radio communication link;
filter a vertical polarization component ($x_v(n)$) and a horizontal polarization component ($x_H(n)$) of the received dual-polarization channel signal by a 2×2 channel weights matrix (W);
determine the 2×2 channel weights matrix (W) based on a minimum variance distortionless response criterion;

apply the determined 2×2 channel weights matrix to the received dual-polarization channel signal to cancel cross-polarization interference between the vertical polarization component ($x_V(n)$) and the horizontal polarization component ($x_H(n)$); and output the cross-polarization interference canceled dual polarization channel signal.

2. The cross-polarization interference canceller of claim 1, wherein the processor further comprises two parallel arms of a same structure spanned by cross-correlation feedback loops.

3. The cross-polarization interference canceller of claim 1, wherein the processor is further configured to operate in a training mode and in a working mode.

4. The cross-polarization interference canceller of claim 3, wherein the processor is further configured to update channel weights ($w_{21LR}(n)$, $w_{12LR}(n)$) of the 2×2 channel weights matrix (W) in the training mode by using Nt pairs of prescribed training sample sequences according to:

$$\begin{cases} w_{21LR}(n) = -\dfrac{\sum_{i=1}^{n}[x_V(i)-s_V(i)]^* y_H(i)}{\sum_{i=1}^{n}|x_H(i)|^2} \\ w_{12LR}(n) = -\dfrac{\sum_{i=1}^{n}[x_H(i)-s_H(i)]^* y_V(i)}{\sum_{i=1}^{n}|x_V(i)|^2} \end{cases} n = 1, \ldots, N_t,$$

where $x_V(i)$ and $x_H(i)$ represent a vertical and a horizontal polarization component, respectively, of the received channel signal in response to an ith pair of the training sample sequences, $s_V(i)$ and $s_H(i)$ represent a vertical and a horizontal polarization component, respectively, of an ith pair of the training sample sequences, $y_V(i)$ and $y_H(i)$ represent a vertical and a horizontal polarization component, respectively, of the received channel signal filtered by the channel weights matrix and n represents a sequence identifier of the Nt pairs of prescribed training sample sequences.

5. The cross-polarization interference canceller of claim 3, wherein the processor is further configured to filter the received channel signal in the working mode by the channel weights matrix (W) as processed during the training mode.

6. The cross-polarization interference canceller of claim 1, wherein the processor is at least one of a digital signal processor and a fixed-point ASIC based microprocessor.

7. The cross-polarization interference canceller of claim 1, wherein the radio communication link comprises a dual-polarization microwave radio multi-carrier communication link.

8. The cross-polarization interference canceller of claim 1, wherein the radio communication link comprises a dual-polarization microwave multi-carrier terrestrial radio communication link.

9. A non-transitory computer readable medium that includes a processor for executing a program code, the program code comprising:

instructions for receiving, by the computer, a dual-polarization channel signal;

instructions for separating the dual-polarization channel signal into a vertical arm signal and a horizontal arm signal;

instructions for determining a 2×2 channel weights matrix based on a minimum variance distortionless response criterion for the vertical arm signal and the horizontal arm signal;

instructions for filtering a vertical polarization component (xV(n)) of the vertical arm signal and a horizontal polarization component (xH(n)) of the horizontal arm signal by the 2×2 channel weights matrix;

instructions for applying the 2×2 channel weights matrix to the vertical arm signal and the horizontal arm signal to suppress cross-polarization interference power; and instructions for outputting the vertical arm signal on a first channel of the computer and outputting the horizontal arm signal on a second channel of the computer.

* * * * *